US010167625B1

(12) United States Patent
Barger

(10) Patent No.: US 10,167,625 B1
(45) Date of Patent: Jan. 1, 2019

(54) FOUNDATION ANCHOR SYSTEM AND ANCHOR INSTALLATION METHOD USING THE SAME

(71) Applicant: Michael Grant Barger, Findlay, OH (US)

(72) Inventor: Michael Grant Barger, Findlay, OH (US)

( * ) Notice: Subject to any disclaimer, the term of this patent is extended or adjusted under 35 U.S.C. 154(b) by 472 days.

(21) Appl. No.: 14/833,116

(22) Filed: Aug. 23, 2015

Related U.S. Application Data

(60) Provisional application No. 62/041,709, filed on Aug. 26, 2014.

(51) Int. Cl.
| | |
|---|---|
| *E04B 1/41* | (2006.01) |
| *E04B 2/14* | (2006.01) |
| *E02D 27/01* | (2006.01) |
| *G01B 5/25* | (2006.01) |

(52) U.S. Cl.
CPC .......... *E04B 1/4121* (2013.01); *E02D 27/016* (2013.01); *E04B 2/14* (2013.01); *G01B 5/25* (2013.01)

(58) Field of Classification Search
CPC ........ E04B 1/41; E04B 1/4121; E04B 1/4135; E04B 1/4157; E04B 1/4164; E04B 1/4114; E04B 1/483; E04B 2/14; E02D 27/016; E02D 27/50; E04C 5/12; E04C 5/125
USPC .......... 52/745.12, 742.14, 293.2, 293.3, 295, 52/296, 297, 298
See application file for complete search history.

(56) References Cited

U.S. PATENT DOCUMENTS

| | | | |
|---|---|---|---|
| 991,517 A * | 5/1911 | Kennedy | E04B 1/4121 52/708 |
| 4,642,964 A | 2/1987 | Kellison | |
| 5,060,436 A * | 10/1991 | Delgado, Jr. | B28B 23/005 52/295 |
| 5,205,690 A * | 4/1993 | Roth | E04B 1/4121 411/180 |
| 5,392,573 A | 2/1995 | Gould | |
| 5,562,377 A | 10/1996 | Giannuzzi | |
| 5,937,609 A | 8/1999 | Roth | |
| 6,240,697 B1 * | 6/2001 | Thompson | E04B 1/4121 52/698 |
| 6,705,804 B2 | 3/2004 | Dierker | |
| 7,103,984 B2 | 9/2006 | Kastberg | |

(Continued)

*Primary Examiner* — Jessica L Laux
(74) *Attorney, Agent, or Firm* — The Law Office of Patrick F. O'Reilly III, LLC

(57) ABSTRACT

A foundation anchor system for a building structure is disclosed herein. The foundation anchor system includes a positioning member for setting and aligning a sill plate anchor component in a foundation wall of a building structure, an anchor member configured to be disposed in the foundation wall, and an anchor bolt configured to secure a sill plate member to the foundation wall. The positioning member includes a body portion, first and second downwardly extending tab portions for overlapping opposite sides of the foundation wall, and an anchor component engagement portion configured to removably engage an end of a sill plate anchor or an end of a sill plate anchor bolt. The anchor member includes a tubular body portion with a threaded interior bore, and a frustoconical skirt portion for retaining the anchor member in the foundation wall. An installation method utilizing the foundation anchor system is also disclosed herein.

15 Claims, 8 Drawing Sheets

(56) References Cited

U.S. PATENT DOCUMENTS

| | | | | |
|---|---|---|---|---|
| 7,124,550 B1* | 10/2006 | Deming | ................ | E04B 1/4157 |
| | | | | 52/745.21 |
| 7,287,355 B2 | 10/2007 | Commins | | |
| 7,487,597 B2* | 2/2009 | Diaz | .................... | E04B 1/4157 |
| | | | | 33/562 |
| 8,132,389 B2 | 3/2012 | Gee | | |
| 8,522,507 B2* | 9/2013 | Asada | ................ | B28B 23/0056 |
| | | | | 248/679 |
| 2006/0016140 A1* | 1/2006 | Smith | .................... | E02D 27/02 |
| | | | | 52/295 |
| 2006/0260232 A1 | 11/2006 | Crawford et al. | | |
| 2009/0272067 A1* | 11/2009 | Gilham | ................ | E04B 1/4157 |
| | | | | 52/707 |
| 2010/0290859 A1 | 11/2010 | Noce et al. | | |

* cited by examiner

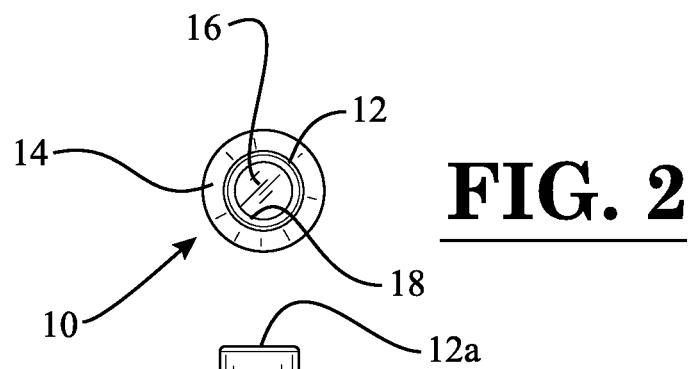
FIG. 2
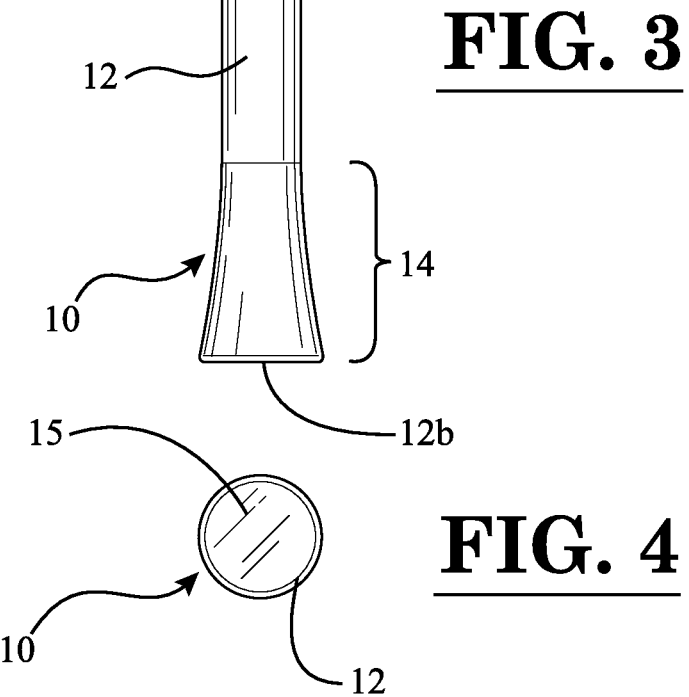
FIG. 3
FIG. 4

Section A-A

FOUNDATION ANCHOR SYSTEM AND ANCHOR INSTALLATION METHOD USING THE SAME

CROSS-REFERENCE TO RELATED APPLICATIONS

This patent application claims priority to, and incorporates by reference in its entirety, U.S. Provisional Patent Application No. 62/041,709, entitled "Foundation Anchor System and Anchor Installation Method Using The Same", filed on Aug. 26, 2014.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a foundation anchor system and an anchor installation method using the same. More particularly, the invention relates to a foundation anchor system, and a method using the same, for setting and aligning anchor components in a foundation wall of a building structure.

2. Background

In typical wood-framed building construction, a wooden sill plate is secured to a masonry foundation wall using a plurality of anchor bolts. The sill plate provides a horizontal securement surface that the wooden stud walls of the building are capable of being attached to (e.g., by using wood nails). In a conventional building, L-shaped anchor bolts are used to secure the sill plate to the foundation wall. During construction, these L-shaped anchor bolts are typically oriented within a foundation wall cavity, and then concrete is poured around the L-shaped anchor bolts within the wall cavity so as to affix the anchor bolts in place inside the wall.

However, prior to, and during the pouring of the foundation wall concrete, it is often very difficult to maintain the proper alignment of the sill plate anchor bolts. As such, rather than being disposed in a straight vertical position in the foundation wall as desired, some of the sill plate anchor bolts often become misaligned in the poured concrete, thereby resulting in the sill plate anchor bolts being disposed in undesirable angled positions within the solidified concrete. When the sill plate anchor bolts are disposed in angled positions, it becomes far more difficult to properly secure the sill plate to the top of the foundation wall. For example, in order to compensate for the misalignment of the anchor bolts, it is often necessary to drill oversized holes in the sill plate that accommodate the diagonally-oriented anchor bolts. Although, these oversized holes introduce excessive tolerances in the building construction, which may undesirably result in the sill plate and its associated stud wall, being loosely attached to the foundation wall. Consequently, improperly aligned sill plate anchor bolts may deleteriously reduce the overall structural rigidity of the building as a whole.

Therefore, what is needed is a positioning member for setting and aligning a sill plate anchor component in a foundation wall of a building structure that maintains the proper alignment of the anchor component in the wall until the wall concrete has solidified. Moreover, a foundation anchor system is needed that facilitates the proper installation of anchor components in a foundation wall of a building by maintaining the proper positioning of these components prior to the solidification of the wall concrete. Furthermore, there is a need for an anchor installation method that efficiently and accurately aligns anchor components within a foundation wall cavity of the building so that the sill plate can be securely attached thereto.

BRIEF SUMMARY OF EMBODIMENTS OF THE INVENTION

Accordingly, the present invention is directed to a foundation anchor system and an anchor installation method using the same that substantially obviates one or more problems resulting from the limitations and deficiencies of the related art.

In accordance with one or more embodiments of the present invention, there is provided a positioning member for setting and aligning a sill plate anchor component in a foundation wall of a building structure. The positioning member includes a body portion having a first end, a second end, and a bottom surface, the second end of the body portion being disposed opposite to the first end of the body portion; a first downwardly extending tab portion disposed at the first end of the body portion and a second downwardly extending tab portion disposed at the second end of the body portion, each of the first and second downwardly extending tab portions extending to a location lower than the bottom surface of the body portion, the first and second downwardly extending tab portions configured to overlap opposite sides of a foundation wall when the positioning member is positioned thereon; and an anchor component engagement portion, the anchor component engagement portion being disposed between the first downwardly extending tab portion and the second downwardly extending tab portion, the anchor component engagement portion configured to removably engage an end of a sill plate anchor or an end of a sill plate anchor bolt.

In a further embodiment of the present invention, the body portion further comprises a finger aperture disposed therethrough, the finger aperture configured to receive a finger of a user therein so as to facilitate a grasping of the positioning member by the user.

In yet a further embodiment, the anchor component engagement portion comprises a generally cylindrical boss, the generally cylindrical boss configured to be inserted into an interior bore of a sill plate anchor body portion.

In still a further embodiment, the body portion further comprises notched areas disposed on opposite sides of the generally cylindrical boss, the notched areas being recessed with respect to the bottom surface of the body portion, each of the notched areas configured to receive a circular wall portion of the sill plate anchor body portion.

In yet a further embodiment, the anchor component engagement portion comprises an annular member with an interior bore, the interior bore of the annular member configured to receive the end of the sill plate anchor bolt.

In still a further embodiment, the body portion is generally in the shape of a triangle, the first downwardly extending tab portion being disposed proximate to a first vertex at a base of the triangle, and the second downwardly extending tab portion being disposed proximate to a second vertex at the base of the triangle.

In accordance with one or more other embodiments of the present invention, there is provided an anchor member configured to be disposed in a foundation wall of a building structure. The anchor member includes a tubular body portion having a first open end and a second closed end, the second closed end of the body portion being disposed opposite to the first open end of the tubular body portion; an interior bore disposed in the tubular body portion, the interior bore comprising a peripheral sidewall with a plurality of internal threads that are configured to matingly engage with a plurality of corresponding external threads on a shaft of an anchor bolt; and a frustoconical skirt portion disposed at the second closed end of the tubular body portion, the frustoconical skirt portion configured to facilitate a retention of the anchor member in the foundation wall of the building structure.

In a further embodiment of the present invention, the peripheral sidewall of the interior bore comprises a non-threaded region disposed between the open end of the tubular body portion and a top edge of the plurality of internal threads.

In yet a further embodiment, the second closed end of the tubular body portion comprises one of: (i) an integrally-formed solid end portion, and (ii) an end cap disposed in the interior bore of the tubular body portion so as to form the second closed end.

In still a further embodiment, an outer surface of the tubular body portion is dimpled or knurled so as to enhance the retention of the anchor member in the foundation wall of the building structure.

In accordance with yet one or more other embodiments of the present invention, there is provided a foundation anchor system. The foundation anchor system includes a positioning member for setting and aligning a sill plate anchor component in a foundation wall of a building structure, an anchor member configured to be disposed in the foundation wall of the building structure, and an anchor bolt configured to secure a sill plate member to the foundation wall of the building structure. The positioning member includes a body portion having a first end, a second end, and a bottom surface, the second end of the body portion being disposed opposite to the first end of the body portion; a first downwardly extending tab portion disposed at the first end of the body portion and a second downwardly extending tab portion disposed at the second end of the body portion, each of the first and second downwardly extending tab portions extending to a location lower than the bottom surface of the body portion, the first and second downwardly extending tab portions configured to overlap opposite sides of a foundation wall when the positioning member is positioned thereon; and an anchor component engagement portion, the anchor component engagement portion being disposed between the first downwardly extending tab portion and the second downwardly extending tab portion, the anchor component engagement portion configured to removably engage an end of a sill plate anchor or an end of a sill plate anchor bolt. The anchor member includes a tubular body portion having a first open end and a second closed end, the second closed end of the body portion being disposed opposite to the first open end of the tubular body portion; an interior bore disposed in the tubular body portion, the interior bore comprising a peripheral sidewall with a plurality of internal threads; and a frustoconical skirt portion disposed at the second closed end of the tubular body portion, the frustoconical skirt portion configured to facilitate a retention of the anchor member in the foundation wall of the building structure. The anchor bolt includes a shaft portion having a first end and a second end, the second end of the shaft portion being disposed opposite to the first end of the shaft portion, the shaft portion having a plurality of external threads disposed thereon, the plurality of external threads configured to threadingly engage with the plurality of internal threads of the interior bore of the anchor member; and a head portion disposed at the first end of the shaft portion, the head portion comprising a bottom ledge that is configured to be fastened against a top surface of the sill plate member when the sill plate member is secured to the foundation wall.

In a further embodiment of the present invention, the body portion of the positioning member further comprises a finger aperture disposed therethrough, the finger aperture configured to receive a finger of a user therein so as to facilitate a grasping of the positioning member by the user.

In yet a further embodiment, the anchor component engagement portion of the positioning member comprises a generally cylindrical boss, the generally cylindrical boss configured to be inserted into the interior bore of the tubular body portion of the anchor member.

In still a further embodiment, the body portion of the positioning member further comprises notched areas disposed on opposite sides of the generally cylindrical boss, the notched areas being recessed with respect to the bottom surface of the body portion of the positioning member, each of the notched areas configured to receive a portion of the peripheral sidewall of the tubular body portion of the anchor member.

In yet a further embodiment, the body portion of the positioning member is generally in the shape of a triangle, the first downwardly extending tab portion being disposed proximate to a first vertex at a base of the triangle, and the second downwardly extending tab portion being disposed proximate to a second vertex at the base of the triangle.

In still a further embodiment, the peripheral sidewall of the interior bore of the anchor member comprises a non-threaded region disposed between the open end of the tubular body portion and a top edge of the plurality of internal threads.

In yet a further embodiment, the second closed end of the tubular body portion of the anchor member comprises one of: (i) an integrally-formed solid end portion, and (ii) an end cap disposed in the interior bore of the tubular body portion so as to form the second closed end.

In still a further embodiment, an outer surface of the tubular body portion of the anchor member is dimpled or knurled so as to enhance the retention of the anchor member in the foundation wall of the building structure.

In accordance with still one or more other embodiments of the present invention, there is provided a method of setting and aligning an anchor member in a foundation wall of a building structure. The method includes the steps of: (i) providing a positioning member; (ii) providing an anchor member; (iii) inserting the first open end of the tubular body portion of the anchor member into the anchor component engagement portion of the positioning member; (iv) inserting the tubular body portion of the anchor member into non-solidified concrete of the foundation wall until the bottom surface of the positioning member contacts a top surface of the foundation wall, and the first and second downwardly extending tab portions overlap the opposite sides of the foundation wall; (v) waiting a predetermined period of time until the concrete of the foundation wall is substantially solidified; and (vi) removing the positioning member from engagement with the anchor member so that a sill plate member is capable of being mounted to the foundation wall. The positioning member includes a body portion having a first end, a second end, and a bottom surface, the second end of the body portion being disposed opposite to the first end of the body portion; a first downwardly extending tab portion disposed at the first end of the body portion and a second downwardly extending tab portion disposed at the second end of the body portion, each of the first and second downwardly extending tab portions extending to a location lower than the bottom surface of the body portion, the first and second downwardly extending tab portions configured to overlap opposite sides of a foundation wall when the positioning member is positioned thereon; and an anchor component engagement portion, the anchor component engagement portion being disposed between the first downwardly extending tab portion and the second downwardly extending tab portion. The anchor member includes a tubular body portion having a first open end and a second closed end, the second closed end of the body portion being disposed opposite to the first open end of the tubular body portion; an interior bore disposed in the tubular body portion, the interior bore comprising a peripheral sidewall with a plurality of internal threads; and a frustoconical skirt portion disposed at the second closed end of the tubular body portion, the frustoconical skirt portion configured to facilitate a retention of the anchor member in the foundation wall of the building structure.

In a further embodiment of the present invention, the method further comprises the steps of: (vii) providing one or more anchor bolts, each of the one or more anchor bolts including a shaft portion having a first end and a second end, the second end of the shaft portion being disposed opposite to the first end of the shaft portion, the shaft portion having a plurality of external threads disposed thereon, the plurality of external threads configured to threadingly engage with the plurality of internal threads of the interior bore of the anchor member; and a head portion disposed at the first end of the shaft portion, the head portion comprising a bottom ledge; (viii) providing a sill plate member configured to extend along the top surface of the foundation wall, the sill plate member comprising one or more fastener apertures disposed therein; and (xiv) securing the sill plate member to the foundation wall by threadingly engaging a respective one of the one or more of anchor bolts with the anchor member in the foundation wall.

In yet a further embodiment, the anchor component engagement portion of the positioning member comprises a generally cylindrical boss; and the step of inserting the tubular body portion of the anchor member into the anchor component engagement portion of the positioning member further comprises inserting the generally cylindrical boss of the positioning member into the interior bore of the tubular body portion of the anchor member.

In still a further embodiment, the step of inserting the tubular body portion of the anchor member into non-solidified concrete of the foundation wall further comprises inserting the tubular body portion of the anchor member into the non-solidified concrete of the foundation wall such that a top surface of the first open end of the tubular body portion is disposed a predetermined distance above the top surface of the solidified concrete.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 2 is a top view of an anchor member of the foundation anchor system of FIG. 1;

FIG. 3 is a side view of the anchor member of the foundation anchor system of FIG. 1;

FIG. 4 is a bottom view of the anchor member of the foundation anchor system of FIG. 1;

Throughout the figures, the same parts are always denoted using the same reference characters so that, as a general rule, they will only be described once.

DETAILED DESCRIPTION OF EMBODIMENTS OF THE INVENTION

Figure 1:
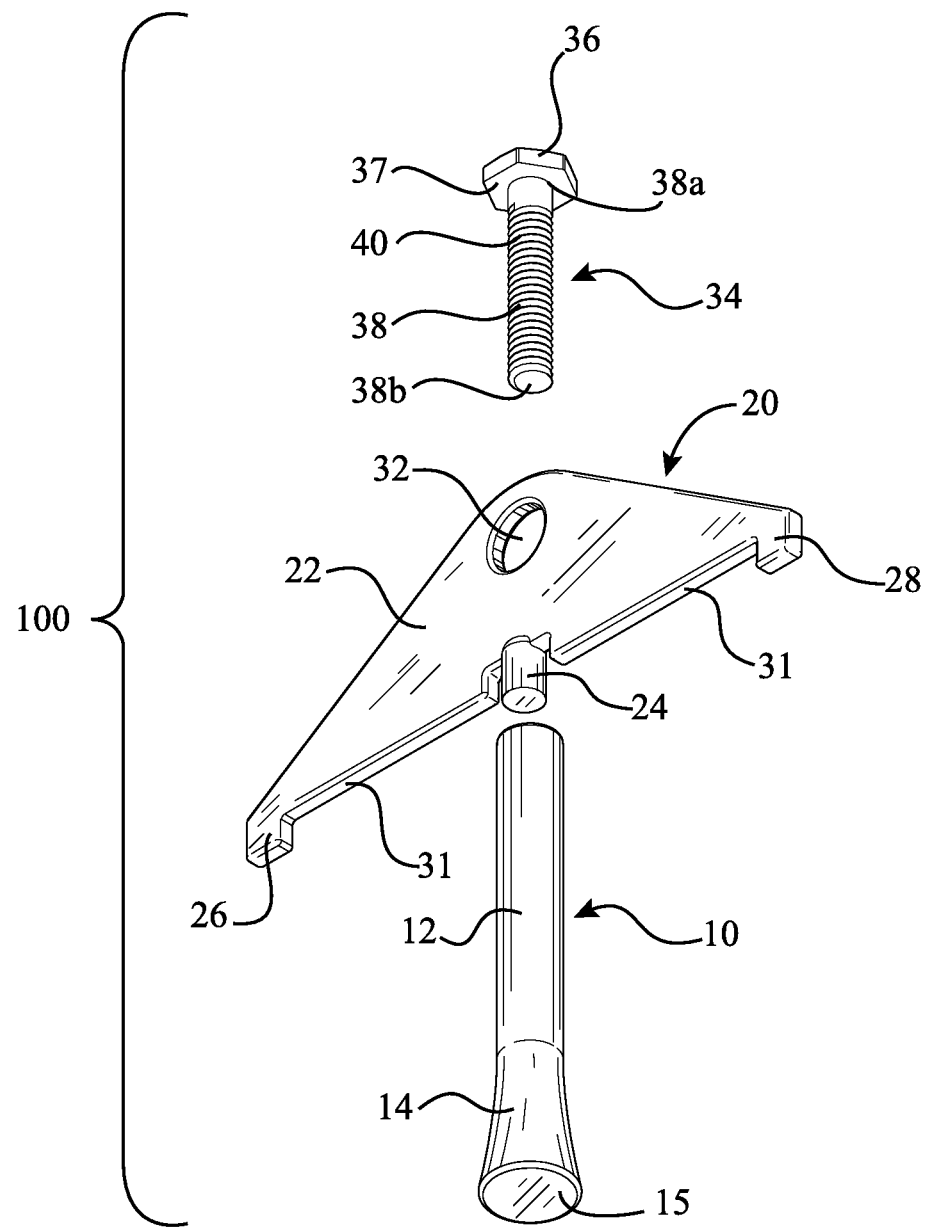
FIG. 1 is an exploded view of a foundation anchor system, according to an embodiment of the invention.
Figure 5:
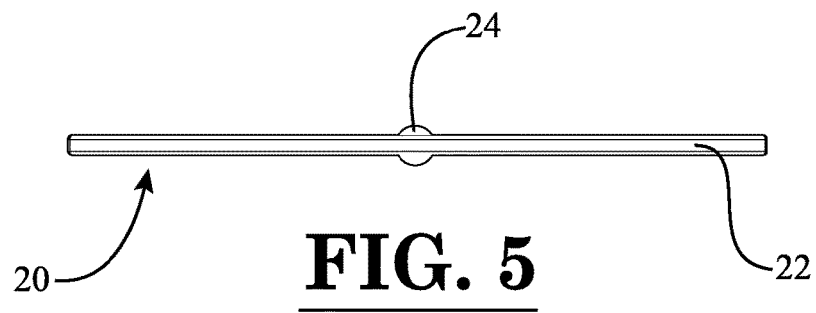
FIG. 5 is a top view of a positioning member of the foundation anchor system of FIG. 1.

An illustrative embodiment of a foundation anchor system is seen generally at 100 in FIG. 1. As shown in this figure, the foundation anchor system 100 generally comprises an anchor member 10 configured to be disposed in a foundation wall of a building structure, a positioning member 20 for setting and aligning a sill plate anchor component in a foundation wall of a building structure, and an anchor bolt 34 configured to secure a sill plate member to a foundation wall of a building structure. Each of these system components 10, 20, 34 will be described in detail hereinafter.

Initially, with reference to FIGS. 1-4, the anchor member 10 of the foundation anchor system 100 will be explained. As particularly shown in FIG. 3, the anchor member 10 includes a tubular body portion 12 with a first open end 12a and a second closed end 12b. The second closed end 12b of the anchor member body portion 12 is disposed opposite to the first open end 12a of the tubular body portion 12. As best illustrated in the top view of FIG. 2, the anchor member body portion 12 has an interior bore 16 disposed therein for receiving the shaft 38 of the sill plate anchor bolt 34. The interior bore 16 has a peripheral sidewall with a threaded portion 18, which includes a plurality of internal threads that matingly engage with a plurality of corresponding external threads on the shaft 38 of the anchor bolt 34 (see FIGS. 2 and 16). In addition, it can be seen in the sectional view of FIG. 16 that the peripheral sidewall of the interior bore 16 comprises also includes a non-threaded upper portion 19 disposed between the first open end 12a of the anchor member tubular body portion 12 and a top edge of the plurality of internal threads. The non-threaded upper portion 19 accommodates the cylindrical boss 24 of the positioning member 20 in a friction-type fit when the boss 24 is inserted into the open end of the anchor member body portion 12. Referring again to FIGS. 1, 3, and 16, it can be seen that the anchor member 10 includes a frustoconical skirt portion 14 disposed at the second end 12b of its tubular body portion 12. The frustoconical skirt portion 14 is in the form of a belled lower end portion of the tubular body portion 12, and it facilitates the retention of the anchor member 10 in a foundation wall of a building structure (i.e., it prevents the anchor member 10 from being pulled out of the foundation wall in an axial direction because the belled end portion becomes securely embedded in the solidified concrete).

Figure 16:
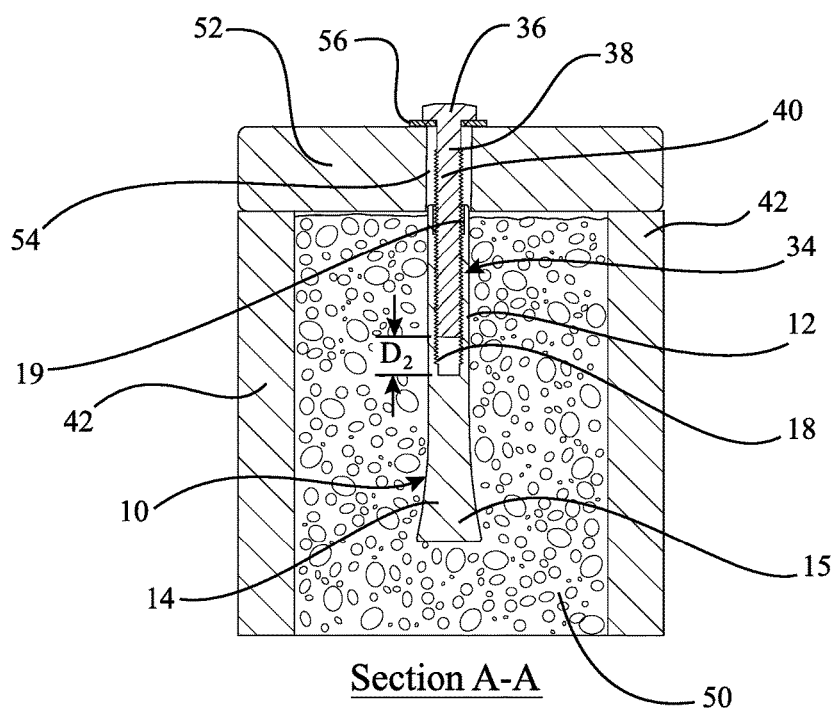
FIG. 16 is a transverse sectional view illustrating the manner in which a sill plate is attached to an anchor member, the sectional view being generally cut along the cutting-plane line A-A in FIG. 13.

As shown in FIGS. 1, 3, and 16, the second end 12b of anchor member tubular body portion 12 comprises an integrally-formed solid end portion 15 in the illustrated embodiment. However, it is to be understood that, in other embodiments of the invention, the second closed end 12b may comprise other configurations. For example, rather than having an integrally-formed solid end portion 15, the interior bore 16 may extend completely through the anchor member 10 from its first end 12a to its second end 12b, and the bore 16 may be closed at the second end 12b of the tubular body portion 12 with an end cap, thereby forming the second closed end 12b.

In one or more embodiments, an outer surface of the tubular body portion 12 of the anchor member 10 is dimpled or knurled so as to enhance the retention of the anchor member 10 in the foundation wall of the building structure. When the anchor member 10 is inserted into the non-solidified concrete of the foundation wall, the non-solidified concrete fills in the gaps of the dimples or knurling on the anchor member body portion 12 so as to securely affix the anchor member 10 in place in the foundation wall.

In an exemplary embodiment, the anchor member 10 may have an overall length (i.e., from its first end 12a to its second end 12b) of approximately six (6) inches, and the threaded portion 18 of the anchor member 10 may have an overall length (or thread depth) of approximately four (4) inches. Although, it is to be understood that the invention is in no way limited to these particular dimensions. Rather, the invention may be practiced using any other suitable dimensions without departing from the spirit and scope of the appended claims.

In one or more embodiments, the anchor member 10 may be formed from cut sections of extruded metal pipe, wherein the entire circumference of the bottom end of the pipe is flattened to form the belled lower end portion 14. Alternatively, two opposed side portions of the bottom end of the pipe may be flattened to form flared projections, or the bottom end of the pipe may be bent at an angle of approximately forty-five (45) to approximately ninety (90) degrees, inclusive (or at an angle of forty-five (45) to ninety (90) degrees, inclusive). The bottom end of the pipe may be closed by filling it with a molten metallic material, or alternatively, by using a cap member to close the bottom end (i.e., so as to prevent concrete from entering the interior bore 16). In these one or more embodiments, the body portion 12 of the anchor member 10 is not formed from cast or molded metal so as to substantially reduce the manufacturing costs of the anchor member 10.

Figure 6:
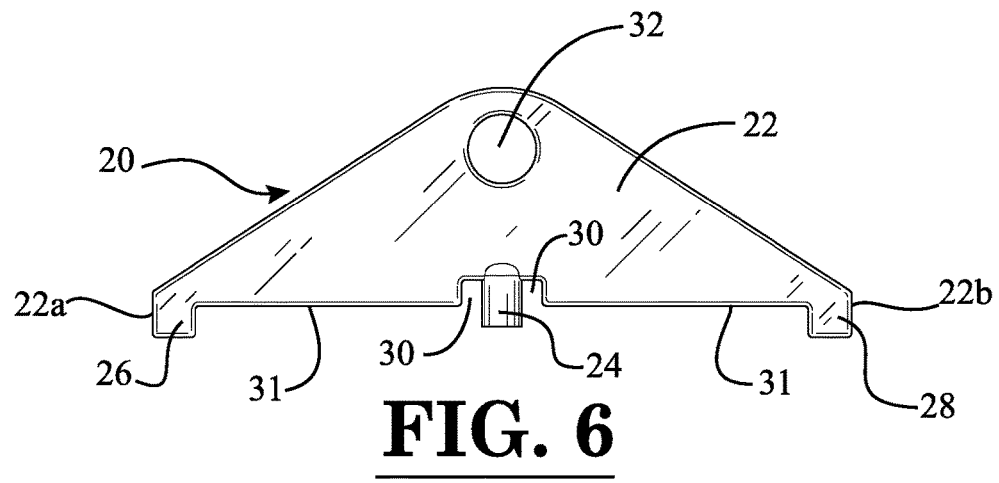
FIG. 6 is a side view of the positioning member of the foundation anchor system of FIG. 1.
Figure 7:
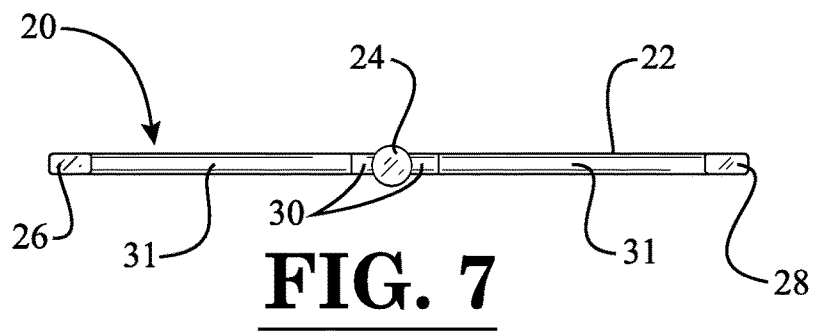
FIG. 7 is a bottom view of the positioning member of the foundation anchor system of FIG. 1.
Figure 8:
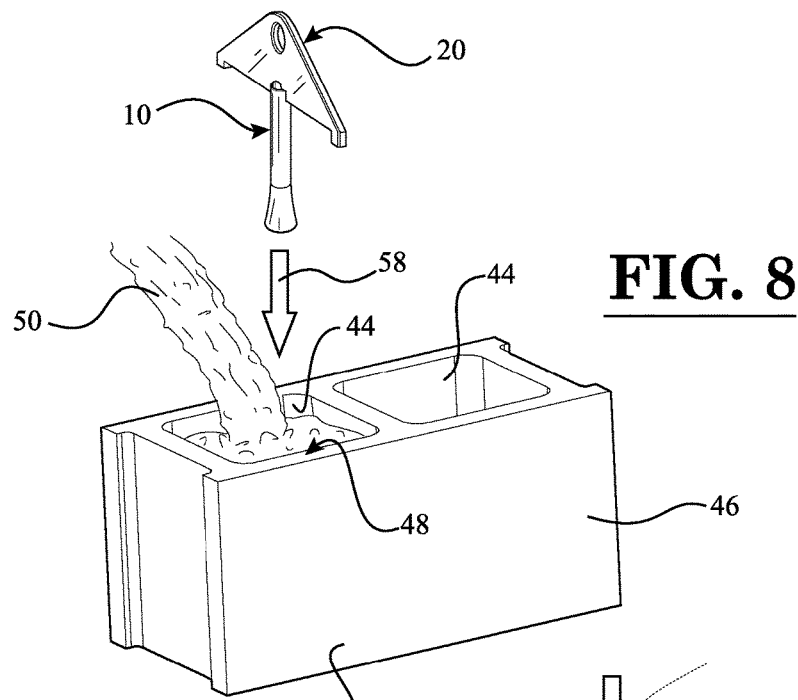
FIG. 8 is a perspective view illustrating a first step in an installation method that utilizes the foundation anchor system of FIG. 1.
Figure 9:
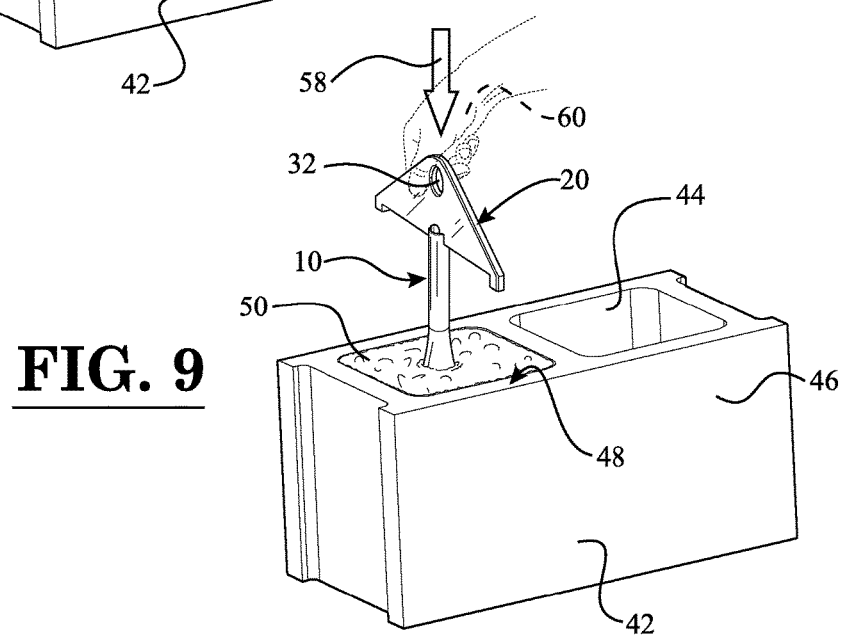
FIG. 9 is a perspective view illustrating a second step in an installation method that utilizes the foundation anchor system of FIG. 1.

Next, with reference to FIGS. 1 and 5-7, the positioning member 20 of the foundation anchor system 100 will be described. As particularly shown in FIGS. 1 and 6, the positioning member 20 includes a body portion 22 having a first end 22a, a second end 22b, and a bottom surface 31. The second end 22b of the body portion is disposed opposite to the first end 22a of the body portion 22. Referring collectively to FIGS. 1, 6, and 7 it can be seen that the positioning member 20 further includes a first downwardly extending tab portion 26 disposed at the first end 22a of the body portion 22 and a second downwardly extending tab portion 28 disposed at the second end 22b of the body portion 22. Each of the first and second downwardly extending tab portions 26, 28 extends to a location that is lower than the bottom surface 31 of the body portion 22 (i.e., the bottom surface of each downwardly extending tab portion 26, 28 is disposed below, and spaced apart from the bottom surface 31 of the positioning member 20 by a predetermined distance, e.g., a distance of approximately one-half (½) of an inch). When the positioning member 20 is positioned on a foundation wall, the first and second downwardly extending tab portions 26, 28 overlap opposite sides of the foundation wall. As depicted in FIGS. 1 and 5-7, the positioning member 20 further comprises an anchor component engagement portion 24. The anchor component engagement portion 24 is disposed between the first downwardly extending tab portion 26 and the second downwardly extending tab portion 28. The anchor component engagement portion 24 removably engages an end of a sill plate anchor member 10 or an end of a sill plate anchor bolt (e.g., a sill plate anchor bolt with an L-shaped distal end portion that is embedded in a concrete foundation wall).

In the illustrative embodiment, it can be seen that the body portion 22 of the positioning member 20 further includes a circular finger aperture 32 disposed therethrough (e.g., see FIGS. 1 and 6). The circular finger aperture 32 is disposed proximate to the topmost edge of the positioning member body portion 22. The circular finger aperture 32 receives a finger of a user therein so as to facilitate a grasping of the positioning member 20 by the user when the positioning member 20 is being set in place on a foundation wall.

Also, in the illustrative embodiment, the anchor component engagement portion of the positioning member 20 comprises a generally cylindrical boss 24 (e.g., refer to FIGS. 1, 6, and 7). When the positioning member 20 is engaged with the sill plate anchor member 10, the generally cylindrical boss 24 is inserted into the interior bore 16 of the anchor member body portion 12. In particular, as mentioned above, the generally cylindrical boss 24 is inserted into non-threaded upper portion 19 of the anchor member interior bore 16 in a friction-type fit. As best shown in FIGS. 6 and 7, the body portion 22 of the positioning member 20 further comprises notched areas 30 disposed adjacent to, and on opposite sides of the generally cylindrical boss 24. The notched areas 30 are recessed with respect to the bottom surface 31 of the positioning member body portion 22. When the positioning member 20 is engaged with the sill plate anchor member 10, each of the notched areas 30 receives a circular sidewall portion of sill plate anchor body portion 12. In other words, the top collar portion of the tubular body portion 12 of the anchor member 10, which is formed by the circular sidewall of the body portion 12, is received within the notched areas 30 of the positioning member body portion 22.

In one or more other embodiments, the anchor component engagement portion of the positioning member 20 may alternatively comprise an annular member with an interior bore. When the positioning member 20 is engaged with a sill plate anchor bolt (e.g., a sill plate anchor bolt with an L-shaped distal end portion), rather than the sill plate anchor member 10, the interior bore of the engagement portion annular member receives the proximal end of the sill plate anchor bolt.

Referring again to FIGS. 1 and 6, it can be seen that the body portion 22 of the positioning member 20 is generally in the shape of a triangle in the illustrative embodiment or, in words, has an overall triangular shape. In particular, the illustrated positioning member body portion 22 is generally in the form of an isosceles triangle, wherein the top diagonally extending sides have lengths that are approximately the same. As shown in these figures, the first downwardly extending tab portion 26 is disposed proximate to a first vertex at a base of the triangle, whereas the second downwardly extending tab portion 28 is disposed proximate to a second vertex at the base of the triangle. The peak of the triangular body portion 22 is rounded or filleted so as to avoid a sharp point at the top of the body portion 22 that could potentially injure a user thereof (e.g., by cutting his or her hand or finger).

In an exemplary embodiment, the positioning member 20 may have an overall length (i.e., from its first end 22a to its second end 22b) of approximately nine (9) inches, and the positioning member 20 may have an overall height (i.e., from the bottom surface of each of the downwardly extending tab portions 26, 28 to the top peak of the body portion 22) of approximately three (3) inches. Although, it is to be understood that the invention is in no way limited to these particular dimensions. Rather, the invention may be practiced using any other suitable dimensions without departing from the spirit and scope of the appended claims. For example, in order to accommodate foundation wall widths of six (6) inches and twelve (12) inches, as well as eight (8) inches, the overall length of the positioning member 20 alternatively may be approximately seven (7) inches and thirteen (13) inches, respectively.

Figure 12:
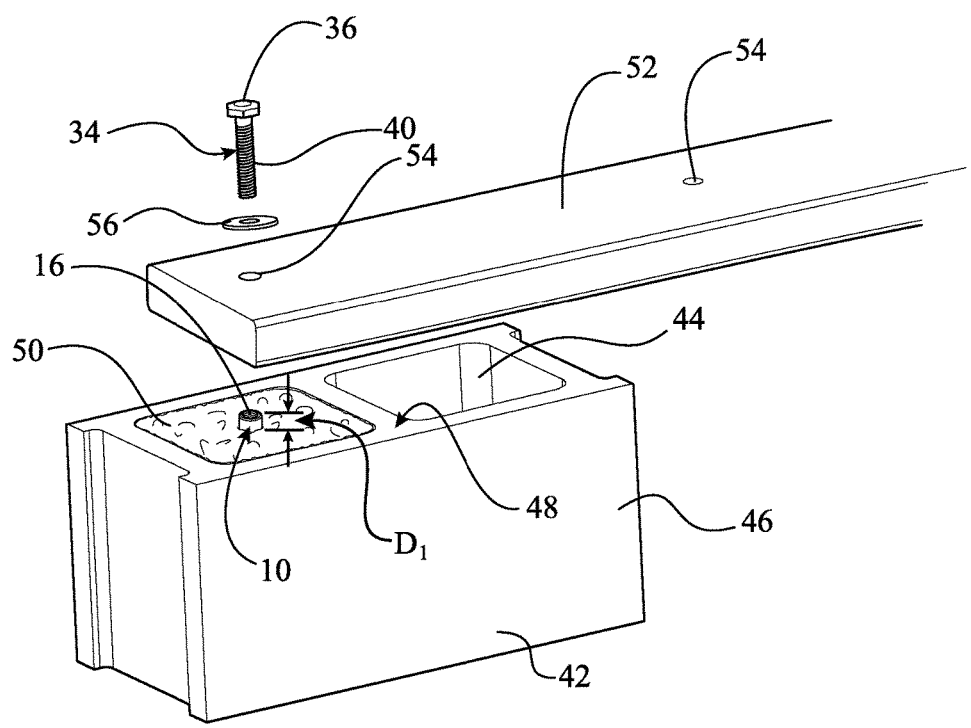
FIG. 12 is a perspective view illustrating a fifth step in an installation method that utilizes the foundation anchor system of FIG. 1.
Figure 13:
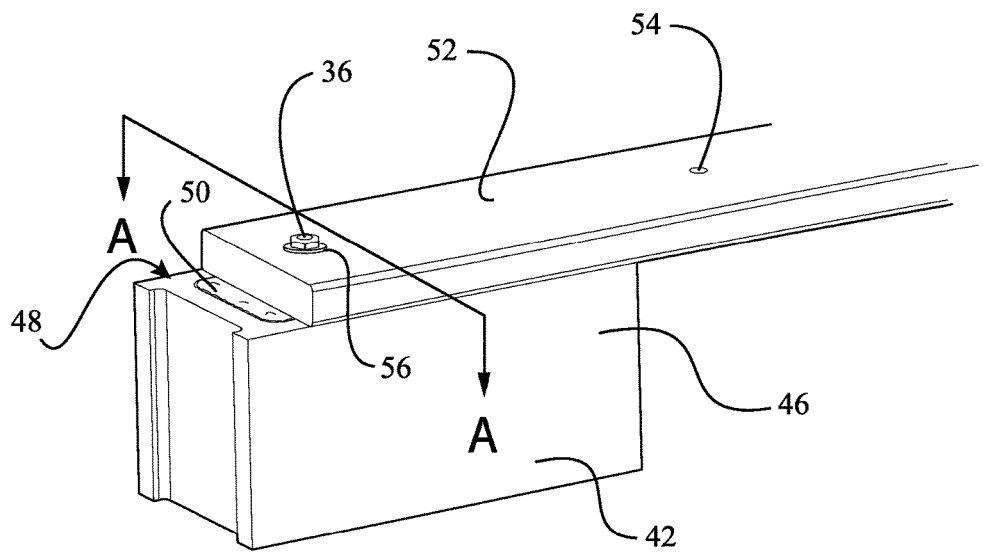
FIG. 13 is a perspective view illustrating a sixth step in an installation method that utilizes the foundation anchor system of FIG. 1.

Now, referring to FIGS. 1, 12, and 16, the sill plate anchor bolt 34 of the foundation anchor system 100 will be explained. As best shown in FIGS. 1 and 16, the sill plate anchor bolt 34 includes a shaft portion 38 having a first end 38a and a second end 38b. The second end 38b of the shaft portion 38 is disposed opposite to the first end 38a of the shaft portion 38. In FIGS. 1 and 16, it can be seen that the shaft portion 38 of the bolt 34 has a plurality of external threads 40 disposed thereon. When the sill plate anchor bolt 34 is engaged with the anchor member 10 (e.g., as illustrated in FIG. 16), the plurality of external threads 40 on the bolt 34 threadingly engage with the plurality of internal threads on the internally threaded portion 18 of the interior bore 16 of the anchor member 10. As depicted in FIGS. 1 and 16, the sill plate anchor bolt 34 further includes a head portion 36 disposed at the first end 38a of the shaft portion 38. The head portion 36 comprises a bottom ledge 37 that is fastened against a top surface of a sill plate member 52 or washer 56 (e.g., as shown in FIG. 16) when the sill plate member 52 is secured to a foundation wall.

Figure 10:
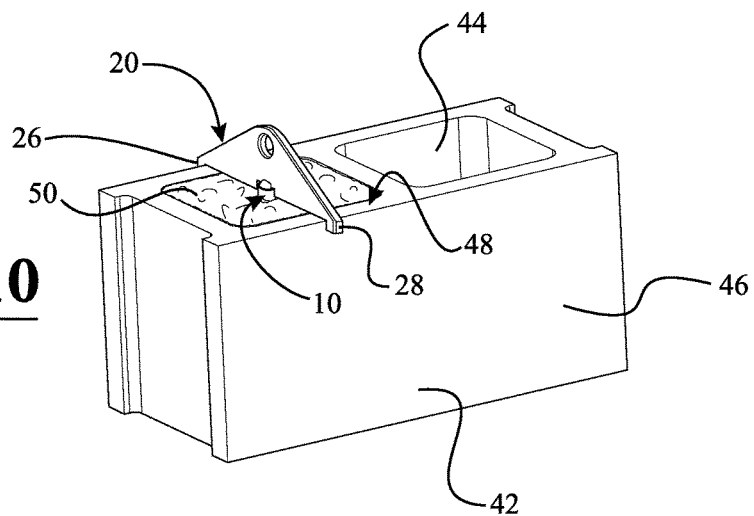
FIG. 10 is a perspective view illustrating a third step in an installation method that utilizes the foundation anchor system of FIG. 1.
Figure 11:
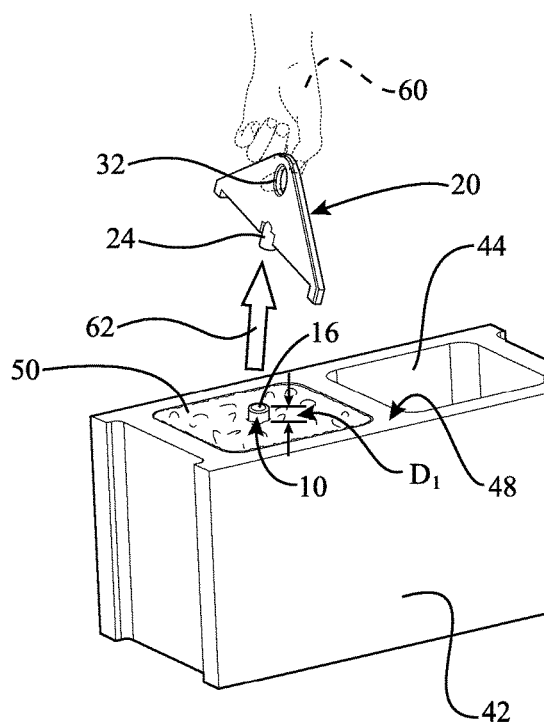
FIG. 11 is a perspective view illustrating a fourth step in an installation method that utilizes the foundation anchor system of FIG. 1.

Now, referring primarily to FIGS. 8-13, a foundation anchor installation procedure, which utilizes the components of the anchor foundation system 100, will be described in detail. Initially, a user inserts the anchor component engagement portion 24 of the positioning member 20 into the first open end 12a of the tubular body portion 12 of the anchor member 10 (i.e., the generally cylindrical boss 24 of the positioning member 20 is inserted into the non-threaded end portion 19 of the interior bore 16 of anchor member 10) so that the anchor component engagement portion 24 removably engages the non-threaded portion 19 of the anchor member interior bore 16 in a friction-type fit. Once the anchor member 10 has been removably coupled to the positioning member 20, it is ready to be inserted into the concrete of the building foundation wall. As shown in the illustrative embodiment of FIG. 8, non-solidified or liquid concrete 50 is poured into an internal core 44 of a concrete block 42 (e.g., a 12"L×8"W×8"H concrete block), which may form a part of a foundation wall. Once the non-solidified or liquid concrete 50 is poured into the internal core 44 of the concrete block 42, a user grasps the positioning member 20 using his or her hand 60 and inserts the anchor member 10 generally straight down (as diagrammatically indicated by arrow 58 in FIGS. 8 and 9) into the non-solidified or liquid concrete 50 in the internal core 44 of the concrete block 42. Turning now to FIG. 10, it can be seen that the tubular body portion 12 of the anchor member 10 is inserted into the non-solidified concrete in the internal core 44 of the concrete block 42 until the bottom surface 31 of the positioning member 20 contacts the top surface 48 of the concrete block 42, and the first and second downwardly extending tab portions 26, 28 overlap opposite sidewalls 46 of the concrete block 42. As best shown in FIG. 11, the tubular body portion 12 of the anchor member 10 may be inserted into the non-solidified concrete 50 of the concrete block 42 such that a top surface of the first open end 12a of the tubular body portion 12 is disposed a predetermined distance $D_1$ above the top surface of the concrete 50. In other embodiments, the anchor member 10 may be inserted into the concrete 50 so that the top surface of the first end 12a of the tubular body portion 12 is substantially flush with the top surface of the concrete 50. After the anchor member 10 has been inserted into the non-solidified concrete in the internal core 44 of the concrete block 42, the user waits a predetermined period of time (e.g., 4-18 hours) until the concrete in the internal core 44 of the concrete block 42 is substantially solidified (i.e., until the concrete sets up). Then, after the internal core 44 of the concrete block 42 is substantially solidified (i.e., set up), the positioning member 20 is removed from engagement with the anchor member 10 (as diagrammatically indicated by arrow 62 in FIG. 11) so that a sill plate member 52 is capable of being mounted to the concrete block 42.

Once, the positioning member 20 has been removed from engagement with the anchor member 10, the sill plate member 52 (e.g., a 2"×8" wood board) is able to be mounted to the concrete block 42. As shown in FIG. 12, the sill plate member 52 is provided with a plurality of fastener apertures 54 disposed along the length thereof. Each of the fastener apertures 54 is configured to receive a respective one of the sill plate anchor bolts 34. With combined reference to FIGS. 12 and 13, it can be that the sill plate member 52 is secured to the concrete block 42, which forms the foundation wall, by virtue of one or more of the sill plate anchor bolts 34 threadingly engaging respective ones of the anchor members 10. In the sectional view of FIG. 16, it can be seen that, when the sill plate member 52 is completely secured to the anchor member 10, a clearance distance $D_2$ exists between the second end 38b of the anchor bolt 34 and the bottom of the interior bore 16 so that the second end 38b of the anchor bolt 34 does not reach the bottom of the interior bore 16, which would deleteriously prevent the anchor bolt 34 from being completely fastened down against the top surface of the sill plate member 52. Also, as best shown in FIG. 12, a washer 56 may be provided between the bottom ledge 37 of the head portion 36 of each sill plate anchor bolt 34 and the top surface of the sill plate member 52 (i.e., the washer 56 is sandwiched between the bottom ledge 37 of the bolt head portion 36 and the top surface of the sill plate member 52).

Figure 14:
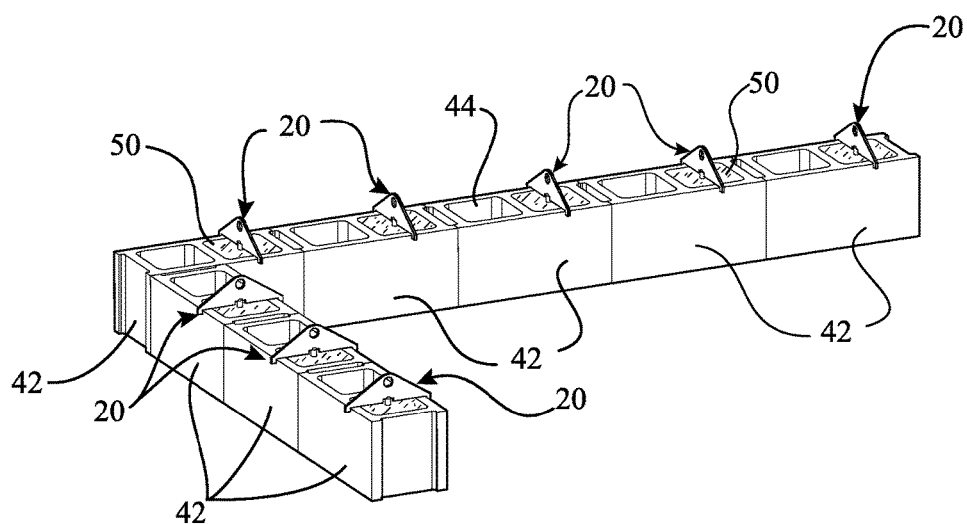
FIG. 14 is a perspective view illustrating a plurality of anchor members being held in place with respective positioning members on a building foundation wall.
Figure 15:
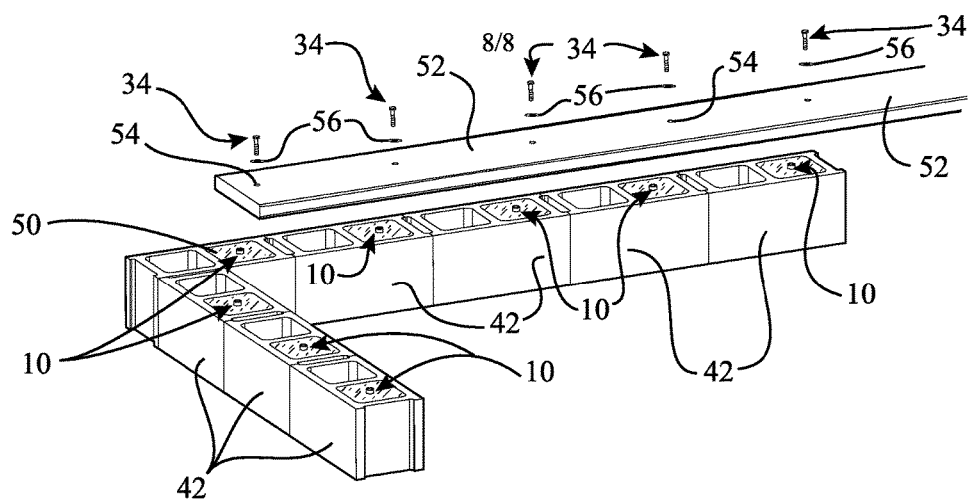
FIG. 15 is a perspective view illustrating the manner in which a sill plate member is attached to anchor members in a building foundation wall after the positioning members have been removed from the anchor members.

In FIG. 14, a plurality of positioning members 20 are shown spaced apart along the length of a building foundation wall, which is formed by a plurality concrete blocks 42. Each of the positioning members 20 is holding a respective anchor member 10 in place while the concrete 50 in the internal cores 44 of the concrete blocks 42 solidifies (i.e., sets up). Turning to FIG. 15, it can be seen that each of the positioning members 20 has been removed, and a sill plate member 52 is now ready to be secured to the anchor members 10 by anchor bolts 34 and respective washers 56.

While FIGS. 8-16 of the illustrative embodiment depict a building foundation wall that is formed by a plurality of concrete blocks 42, it is to be understood that the foundation anchor system 100 described herein is equally applicable to poured concrete foundation walls. In poured concrete foundation walls, rather than being inserted into non-solidified concrete 50 in the concrete block cores 44, the anchor members 10 are inserted directly into the concrete forming the wall. The positioning members 20 hold the anchor members 10 in place until the concrete of the poured concrete wall solidifies or sets up.

It is readily apparent that the aforedescribed foundation anchor system 100 offers numerous advantages. First, the foundation anchor system 100 includes a positioning member 20 for setting and aligning a sill plate anchor component (e.g., anchor member 10) in a foundation wall of a building structure that maintains the proper alignment of the anchor component 10 in the wall until the wall concrete has solidified. Secondly, the foundation anchor system 100 facilitates the proper installation of anchor components (e.g., anchor members 10) in a foundation wall of a building by maintaining the proper positioning of these components 10 prior to the solidification of the wall concrete. Finally, the utilization of the foundation anchor system 100 results in an anchor installation method that efficiently and accurately aligns anchor components 10 within a foundation wall cavity of the building so that the sill plate 52 can be securely attached thereto. Also, because the anchor component engagement portion 24 (i.e., the generally cylindrical boss 24) of the positioning member 20 closes the open end 12a of the anchor member 10 when it is positioned in place in the non-solidified concrete of the foundation wall, an anchor bolt is not installed in the anchor member 10 when it is inserted into the concrete, and thus, an anchor bolt does not have to be removed from the anchor member 10 once the concrete is cured. In addition, the anchor member 10 does not comprise a separate, removable cap member for capping off its open end 12a. After all, there is no need for using either an anchor bolt or a separate cap member for closing off the open end of the interior bore 16 of the anchor member 10 because the anchor component engagement portion 24 (i.e., the generally cylindrical boss 24) of the positioning member 20 already acts as a cap to prevent concrete from inadvertently entering the bore 16 when the anchor member 10 is inserted into the non-solidified concrete of the foundation wall. Advantageously, the anchor component engagement portion 24 (i.e., the generally cylindrical boss 24) of the positioning member 20 both protects the internal threads of the anchor member 10 during the concrete cure period and it aligns and establishes the elevation of the anchor member 10 in the concrete 50.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A positioning member for setting and aligning a sill plate anchor component in a foundation wall of a building structure, said positioning member comprising:

a body portion having a first end, a second end, and a bottom surface, said second end of said body portion being disposed opposite to said first end of said body portion;

a first downwardly extending tab portion disposed at said first end of said body portion and a second downwardly extending tab portion disposed at said second end of said body portion, each of said first and second downwardly extending tab portions extending to a location lower than said bottom surface of said body portion, said first and second downwardly extending tab portions configured to overlap opposite sides of a foundation wall when said positioning member is positioned thereon; and an anchor component engagement portion, said anchor component engagement portion being disposed between said first downwardly extending tab portion and said second downwardly extending tab portion, said anchor component engagement portion configured to removably engage an end of a sill plate anchor having a sill plate anchor body portion or an end of a sill plate anchor bolt, said anchor component engagement portion comprising a generally cylindrical boss, said generally cylindrical boss configured to be inserted into an interior bore of said sill plate anchor body portion, and said body portion of said positioning member further comprising notched areas disposed on opposite sides of said generally cylindrical boss, said notched areas being recessed with respect to said bottom surface of said body portion, each of said notched areas configured to receive a circular wall portion of said sill plate anchor body portion.

2. The positioning member according to claim 1, wherein said body portion of said positioning member further comprises a finger aperture disposed therethrough, said finger aperture configured to receive a finger of a user therein so as to facilitate a grasping of said positioning member by said user.

3. The positioning member according to claim 1, wherein said body portion of said positioning member is generally in the shape of a triangle, said first downwardly extending tab portion being disposed proximate to a first vertex at a base of said triangle, and said second downwardly extending tab portion being disposed proximate to a second vertex at said base of said triangle.

4. An anchor member configured to be disposed in a foundation wall of a building structure, said anchor member comprising:
a tubular body portion having a first open end and a second closed end, said second closed end of said body portion being disposed opposite to said first open end of said tubular body portion;
an interior bore disposed in said tubular body portion, said interior bore comprising a peripheral sidewall with a plurality of internal threads that are configured to matingly engage with a plurality of corresponding external threads on a shaft of an anchor bolt, said interior bore further comprising a solid bottom floor beneath said plurality of internal threads, said solid bottom floor being disposed perpendicular to said peripheral sidewall of said interior bore; and
a frustoconical skirt portion disposed at said second closed end of said tubular body portion, said frustoconical skirt portion being axially spaced apart from said solid bottom floor of said interior bore along a length of said anchor member, and said frustoconical skirt portion configured to facilitate a retention of said anchor member in said foundation wall of said building structure.

5. The anchor member according to claim 4, wherein said peripheral sidewall of said interior bore comprises a non-threaded region disposed between said open end of said tubular body portion and a top edge of said plurality of internal threads.

6. The anchor member according to claim 4, wherein said second closed end of said tubular body portion comprises one of: (i) an integrally-formed solid end portion, and (ii) an end cap disposed in said interior bore of said tubular body portion so as to form said second closed end.

7. The anchor member according to claim 4, wherein an outer surface of said tubular body portion is dimpled or knurled so as to enhance said retention of said anchor member in said foundation wall of said building structure.

8. The anchor member according to claim 4, wherein said second closed end of said tubular body portion comprises an integrally-formed solid end portion.

9. A foundation anchor system comprising, in combination:
a positioning member for setting and aligning a sill plate anchor component in a foundation wall of a building structure, said positioning member including:

a body portion having a first end, a second end, and a bottom surface, said second end of said body portion being disposed opposite to said first end of said body portion;
a first downwardly extending tab portion disposed at said first end of said body portion and a second downwardly extending tab portion disposed at said second end of said body portion, each of said first and second downwardly extending tab portions extending to a location lower than said bottom surface of said body portion, said first and second downwardly extending tab portions configured to overlap opposite sides of a foundation wall when said positioning member is positioned thereon; and
an anchor component engagement portion, said anchor component engagement portion being disposed between said first downwardly extending tab portion and said second downwardly extending tab portion, said anchor component engagement portion of said positioning member comprising a generally cylindrical boss;
an anchor member configured to be disposed in said foundation wall of said building structure, said anchor member including:
a tubular body portion having a first open end and a second closed end, said second closed end of said body portion being disposed opposite to said first open end of said tubular body portion, said anchor component engagement portion of said positioning member configured to removably engage said first open end of said tubular body portion of said anchor member;
an interior bore disposed in said tubular body portion, said interior bore comprising a peripheral sidewall with a plurality of internal threads, said generally cylindrical boss of said anchor component engagement portion of said positioning member configured to be inserted into said interior bore of said tubular body portion of said anchor member; and
a frustoconical skirt portion disposed at said second closed end of said tubular body portion, said frustoconical skirt portion configured to facilitate a retention of said anchor member in said foundation wall of said building structure; and
an anchor bolt configured to secure a sill plate member to said foundation wall of said building structure, said anchor bolt including:
a shaft portion having a first end and a second end, said second end of said shaft portion being disposed opposite to said first end of said shaft portion, said shaft portion having a plurality of external threads disposed thereon, said plurality of external threads configured to threadingly engage with said plurality of internal threads of said interior bore of said anchor member; and
a head portion disposed at said first end of said shaft portion, said head portion comprising a bottom ledge that is configured to be fastened against a top surface of said sill plate member when said sill plate member is secured to said foundation wall.

10. The foundation anchor system according to claim 9, wherein said body portion of said positioning member further comprises a finger aperture disposed therethrough, said finger aperture configured to receive a finger of a user therein so as to facilitate a grasping of said positioning member by said user.

11. The foundation anchor system according to claim 9, wherein said body portion of said positioning member further comprises notched areas disposed on opposite sides of said generally cylindrical boss, said notched areas being recessed with respect to said bottom surface of said body portion of said positioning member, each of said notched areas configured to receive a portion of said peripheral sidewall of said tubular body portion of said anchor member.

12. The foundation anchor system according to claim 9, wherein said body portion of said positioning member is generally in the shape of a triangle, said first downwardly extending tab portion being disposed proximate to a first vertex at a base of said triangle, and said second downwardly extending tab portion being disposed proximate to a second vertex at said base of said triangle.

13. The foundation anchor system according to claim 9, wherein said peripheral sidewall of said interior bore of said anchor member comprises a non-threaded region disposed between said open end of said tubular body portion and a top edge of said plurality of internal threads.

14. The foundation anchor system according to claim 9, wherein said second closed end of said tubular body portion of said anchor member comprises one of: (i) an integrally-formed solid end portion, and (ii) an end cap disposed in said interior bore of said tubular body portion so as to form said second closed end.

15. The foundation anchor system according to claim 9, wherein an outer surface of said tubular body portion of said anchor member is dimpled or knurled so as to enhance said retention of said anchor member in said foundation wall of said building structure.

* * * * *